(12) United States Patent
Berggren, Jr.

(10) Patent No.: US 11,285,767 B2
(45) Date of Patent: Mar. 29, 2022

(54) MOTORCYCLE TOWING HITCH

(71) Applicant: John Alfred Berggren, Jr., Rosalia, WA (US)

(72) Inventor: John Alfred Berggren, Jr., Rosalia, WA (US)

(*) Notice: Subject to any disclaimer, the term of this patent is extended or adjusted under 35 U.S.C. 154(b) by 151 days.

(21) Appl. No.: 16/719,155

(22) Filed: Dec. 18, 2019

(65) Prior Publication Data

US 2020/0189337 A1 Jun. 18, 2020

Related U.S. Application Data

(60) Provisional application No. 62/781,476, filed on Dec. 18, 2018.

(51) Int. Cl.
*B60D 1/46* (2006.01)
*B60D 1/00* (2006.01)
*B60P 3/077* (2006.01)

(52) U.S. Cl.
CPC ............ *B60D 1/465* (2013.01); *B60D 1/00* (2013.01); *B60P 3/077* (2013.01); *B60D 2001/003* (2013.01)

(58) Field of Classification Search
CPC .... B60D 1/00; B60D 1/465; B60D 2001/003; B60P 3/077
USPC ........................................................ 280/402
See application file for complete search history.

(56) References Cited

U.S. PATENT DOCUMENTS

| 3,428,332 | A  | * | 2/1969 | McCance | B60R 9/06 280/402 |
| 5,938,226 | A  | * | 8/1999 | Transchel | B60R 9/06 280/402 |
| 6,186,727 | B1 | * | 2/2001 | Hamilton | B60P 3/125 280/43.17 |
| 2003/0123964 | A1 | * | 7/2003 | Estes | B60R 9/06 414/462 |

* cited by examiner

*Primary Examiner* — Jacob D Knutson
*Assistant Examiner* — Felicia L. Brittman
(74) *Attorney, Agent, or Firm* — Christensen O'Connor Johnson Kindness PLLC

(57) ABSTRACT

A motorcycle towing hitch 20 includes a receiver 22 to which is attached a lift system 24. The lift system 24 is operable to raise and lower a cradle 26 which receives the front wheel 30 of a motorcycle 32 to hold the front wheel captive in the cradle. The cradle 26 is hinged relative to the lift system to be rotatable about an upright axis 28, for instance, when towing the motorcycle around a corner. A restraint system 34 is provided for preventing the handlebars of the motorcycle to rotate relative to the motorcycle frame. In this manner, when the motorcycle is towed around a corner, the motorcycle frame does not tilt downwardly into the corner as would be the case if the motorcycle frame were permitted to rotate relative to the motorcycle handlebars when negotiating a corner.

20 Claims, 16 Drawing Sheets

MOTORCYCLE TOWING HITCH

CROSS-REFERENCE TO RELATED APPLICATION

This application claims the benefit of U.S. Provisional Application No. 62/781,476, filed Dec. 18, 2018, the entire contents of which are expressly incorporated herein by reference.

BACKGROUND

The present disclosure is directed to a motorcycle towing hitch for securely towing the motorcycle or similar apparatus or vehicle behind a truck, pickup, car, etc. The motorcycle towing hitch is designed so that the front wheel of the motorcycle is held captive in a cradle that is pivotally attached to a lift system about an upright axis, with the lift system engageable within the receiver tube of the vehicle. A cable restraint system locks the front wheel of the motorcycle in the cradle and also prevents the motorcycle fork from rotating relative to the motorcycle frame. As such, when rounding a corner, the motorcycle is held rigid and upright in the cradle thereby preventing the motorcycle from tilting into the corner. This avoids the possibility that the side of the motorcycle will scrape the road or pavement when negotiating a tight or sharp corner.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a motorcycle towing hitch comprises:

a support structure mountable to a towing vehicle;

a cradle for receiving and holding the front wheel of a motorcycle;

a pivot mount to mount the cradle to the support structure to pivot about an upright axis; and a restraining system to restrain the front fork of the motorcycle to pivot relative to the frame of the motorcycle.

In an embodiment described herein, the support structure comprises an elevation system to raise and lower the cradle.

In an embodiment described herein, the elevation system comprises an upright slideway mounted to the support structure and engageable with the slide to which the cradle is mounted; and an actuator for raising and lowering the slide relative to the slideway.

In an embodiment described herein:

the elevation system comprising a base structure carried by the support structure, at least two pivot links having forward ends pivotally connected to the base structure and rearward ends pivotally connected to a cradle mount structure; and a lift actuator to pivot the pivot links about the base structure to raise and lower the cradle mount structure.

In an embodiment described herein, the cradle includes upright side walls connectable by a floor, the side walls spaced apart to receive the front wheel of a motorcycle therebetween.

In an embodiment described herein, the cradle comprises a forward abutment for bearing against the front of the motorcycle wheel when the motorcycle is engaged within the cradle.

In an embodiment described herein, the side walls are generally triangular in shape with an upright front side, a generally horizontal bottom side, and a diagonal hypotenuse that extends rearwardly and downwardly from the front side of the cradle.

In an embodiment described herein, the side walls are curved in an upwardly concave shape to resemble the curvature of a motorcycle wheel.

In an embodiment described herein, the cradle includes movable locking panels disposed along the inside surfaces of the cradle side walls to define the motorcycle wheel receiving gap therebetween, the locking panels being adjustable to press against the side of the motorcycle front wheel thereby to hold the motorcycle front wheel securely within the cradle and also adjustable to separate the locking panels from the sides of the motorcycle front wheel to enable the motorcycle to be removed from the cradle.

In an embodiment described herein, the shape of the perimeter of the locking panels corresponds to the shape of the perimeter of the cradle side walls.

In an embodiment described herein, a biasing system is provided to bias the locking panels to move in a direction away from each other.

In an embodiment described herein, the cradle mounting structure extends sufficiently in the direction laterally of the length of the towing vehicle to enable at least two motorcycle cradles to be mounted on the cradle mounting structure in side-by-side relationship to each other so that the motorcycles engaged within corresponding cradles do not interfere with each other.

In an embodiment described herein, the pivot mount comprises an upper and lower hinge structure connected between the support structure and the cradle to define an upright pivot axis.

In an embodiment described herein, the upper and lower hinges comprise a first hinge bracket mounted on the support structure to extend rearwardly therefrom and a second hinge bracket mounted on the cradle to extend forwardly therefrom, the first and second hinge brackets defining aligned holes for receiving a pivot pin therein.

In an embodiment described herein, the restraining system loads a motorcycle front wheel downwardly into the cradle and simultaneously loads the motorcycle frame forwardly relative to the cradle, thereby preventing the motorcycle fork from rotating relative to the motorcycle frame.

In an embodiment described herein, the restraining system includes a first cable section attached to a lower portion of the fork on each side of the motorcycle to draw the front fork downwardly toward the cradle to load the front fork downwardly into the cradle.

In an embodiment described herein, the restraining system includes a second cable section attached to the front foot rests or front pegs of the motorcycle on each side of the motorcycle to draw the motorcycle frame forwardly towards the cradle.

In an embodiment described herein, the restraining system includes a first cable section attached to a lower portion of the fork on each side of the motorcycle to draw the front fork downwardly toward the cradle to load the front fork downwardly into the cradle.

In an embodiment described herein, the first cable section is attached to the lower portion of the front forks of the motorcycle is the same cable comprising the second cable section attached to the motorcycle foot rests or foot pegs.

In an embodiment described herein, the restraining system comprises a tensioning system to take up slack in the cable comprising the first and second cable sections.

In an embodiment described herein, the take up system comprises a winch for spooling the cable to draw the first and second cable sections toward the cradle.

In an embodiment described herein, further comprising a wheel assembly for supporting the motorcycle hitch is not mounted on a towing vehicle, the wheel assembly comprising support surface axled to spaced apart wheels, the support surface positionable beneath portions of the motorcycle hitch.

In an embodiment described herein, the wheel assembly comprises a first bracket carried by the support wheels, the first bracket engageable with a second bracket is attached to the support structure.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
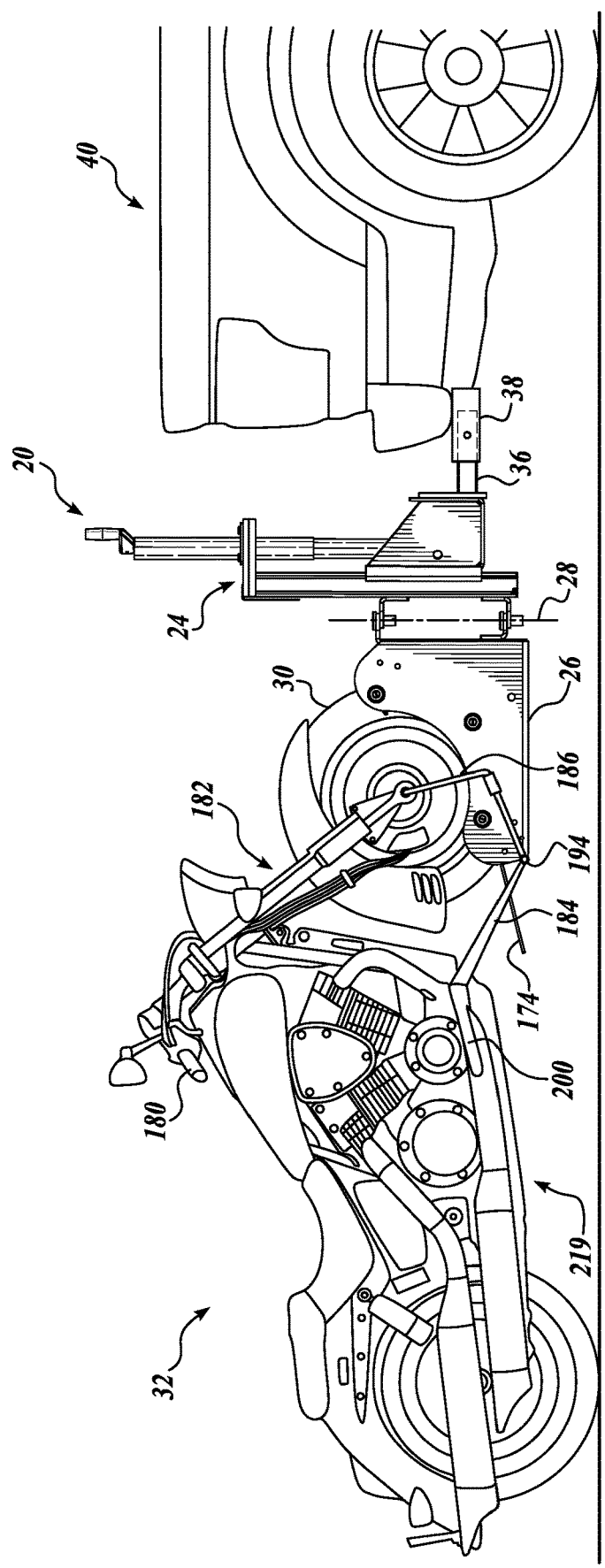
FIG. 1 is a side elevational view of a motorcycle towing hitch according to the present disclosure showing attached to a tow vehicle and with a motorcycle engaged with the hitch.
Figure 2:
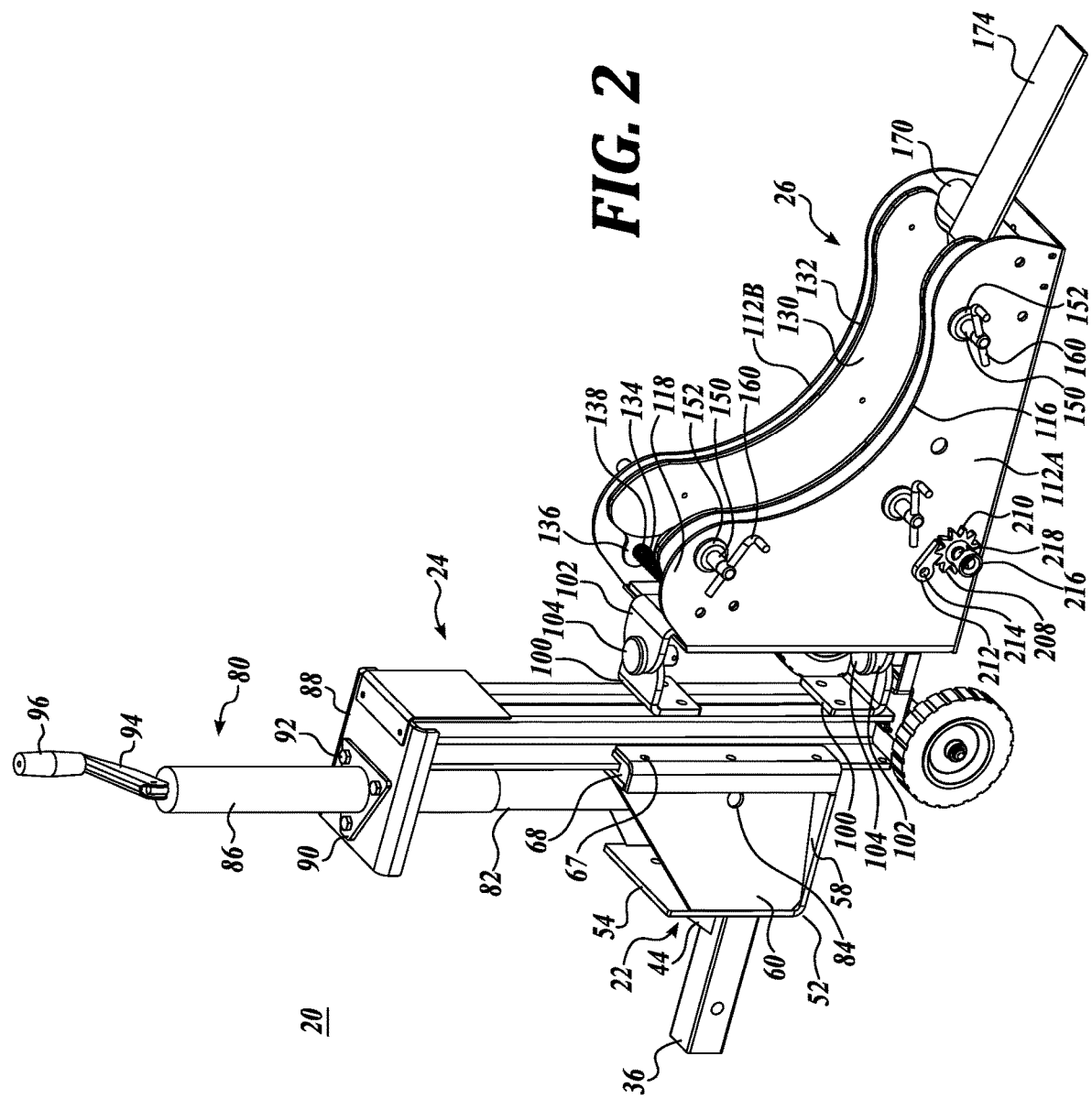
FIG. 2 is a side perspective view of the motorcycle towing hitch of the present disclosure taken from the rear of the hitch.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "ahead," "behind," "upward," "downward," "above," "below," "top," "bottom," "right hand," "left hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out. If a quantitative value is needed to render the applicable parameter sufficiently definite, the applicable parameter is within five percent (5%) of the designated parameter value.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units that are the same or similar are not repeated so as to avoid redundancy in the present application.

In a first basic form, the motorcycle towing hitch 20 of the present disclosure includes a receiver 22 to which is attached a lift system 24. The lift system 24 is operable to raise and lower a cradle 26 which is hinged relative to the lift system about an upright (vertical) axis 28. The cradle 26 functions to receive the front wheel 30 of a motorcycle 32 and hold the wheel captive within the cradle. The handlebars of the motorcycle 32 are prevented from rotating relative to the motorcycle frame by a cable restraint system 34 extending between the motorcycle and the motorcycle hitch, and in particular the cradle 26.

Describing the motorcycle towing hitch 20 in more detail, the receiver 22 includes a receiver bar 36 which is receivable within a standard receiver tube 38 mounted to the rear of a vehicle, such as vehicle 40 shown in FIG. 1. The receiver 22 also includes a vertical mounting plate 42 to which the adjacent (rearward) end of the receiver bar 36 is attached to cantilever outwardly (forwardly) therefrom. An optional reinforcement plate 44 extends between the top surface of the receiver bar 36 and the adjacent face of the mounting plate 42 thereby to provide reinforcement there between. As shown in the figures, including FIG. 12, the reinforcement plate 44 is generally triangular in shape owing to the perpendicular relationship between the horizontal receiver bar 36 and the vertical mounting plate 42. Of course, the reinforcement plate 44 can be of other shapes, and additional reinforcement plates or other reinforcement means may be utilized between the receiver bar 36 and the mounting plate 42.

Next, with respect to the lift system 24, this system functions to raise and lower the cradle 26. In a lowered position, the cradle 26 can rest on or near the ground so that the cycle 32 can be conveniently rolled forwardly so that the front wheel 30 of the cycle is positioned in the cradle 26. Thereafter, the lift system 24 can be operated to raise the cradle 26 upwardly off the ground into towing position, for example, as shown in FIG. 1.

Figure 5:
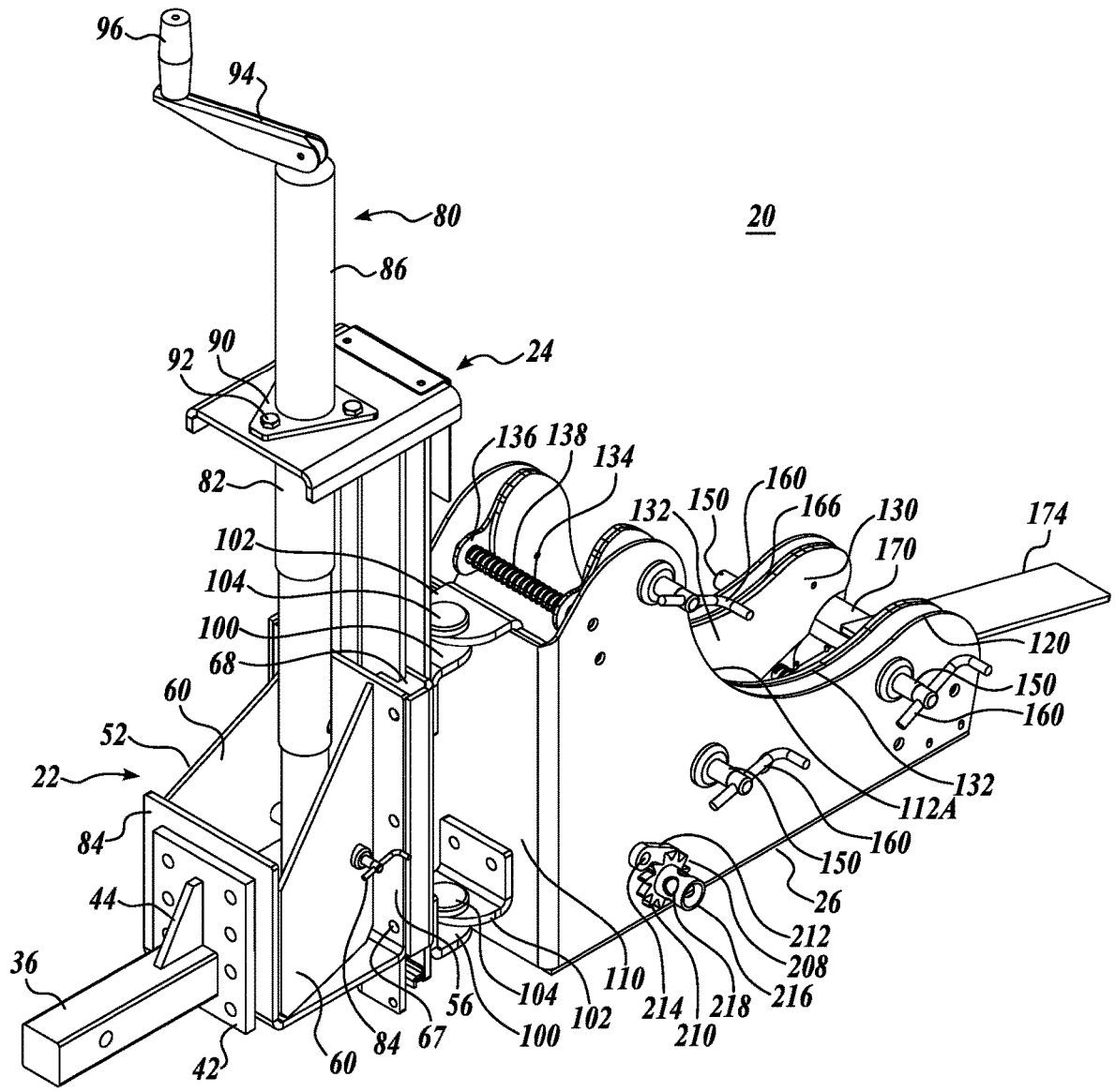
FIG. 5 is a side perspective view of the motorcycle towing hitch taken from the same side of FIG. 2 but from the front of the hitch.
Figure 6:
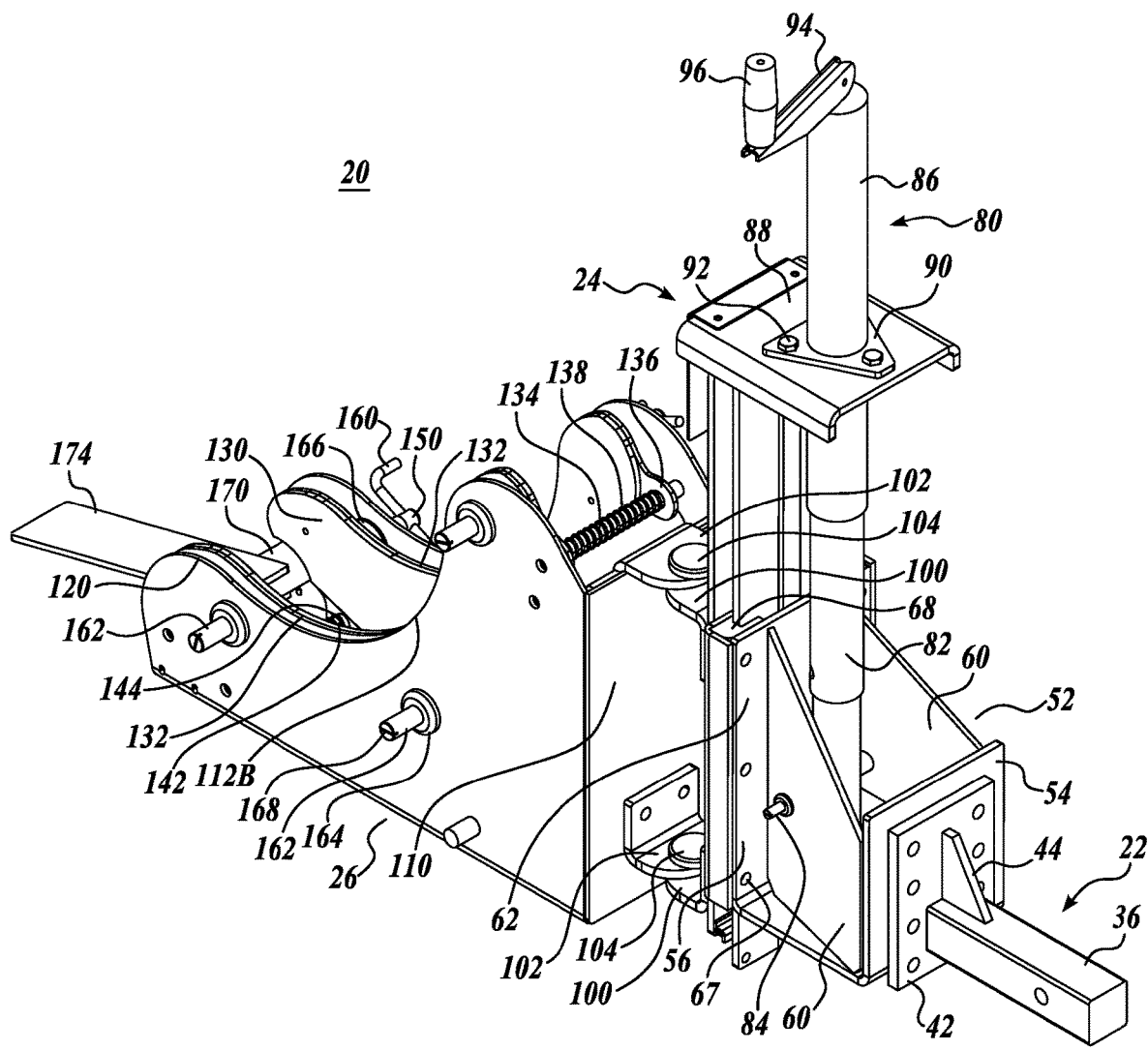
FIG. 6 is a view similar to FIG. 5 but taken from the opposite side of the motorcycle towing hitch.
Figure 7:
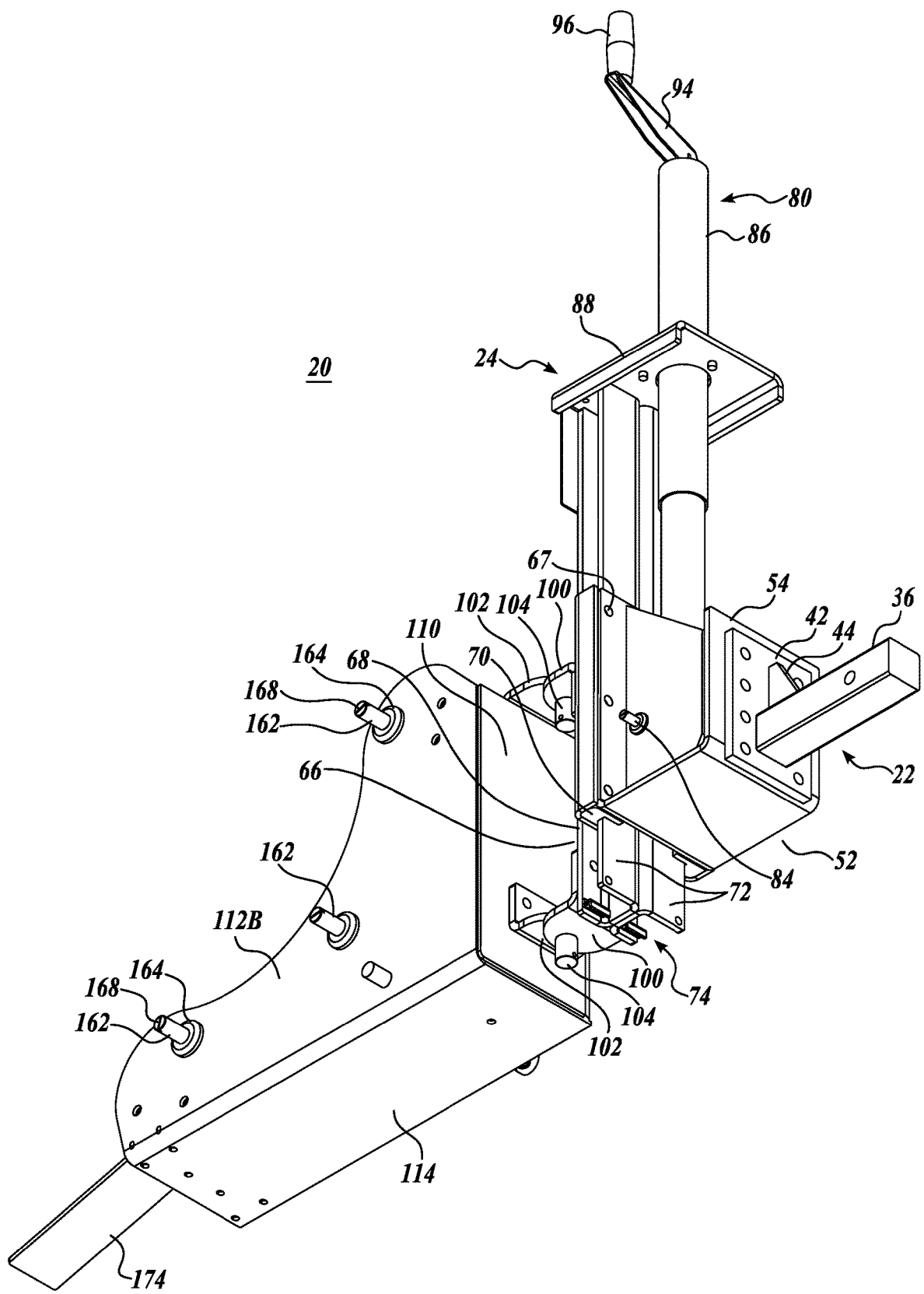
FIG. 7 is a perspective view of the motorcycle towing hitch taken from a position beneath the hitch and from the front of the hitch.
Figure 8:
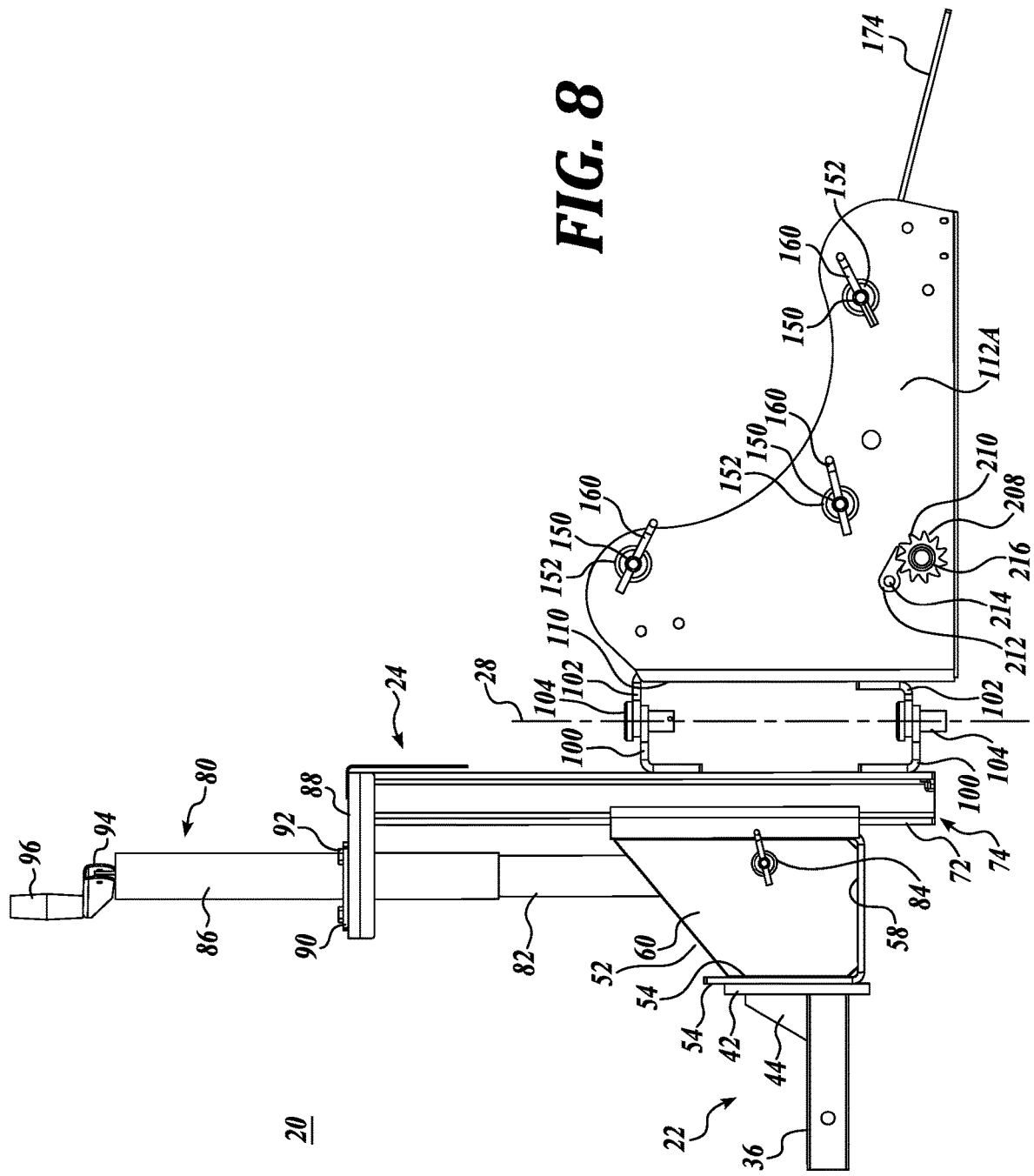
FIG. 8 is a side elevational view of the motorcycle towing hitch.
Figure 9:
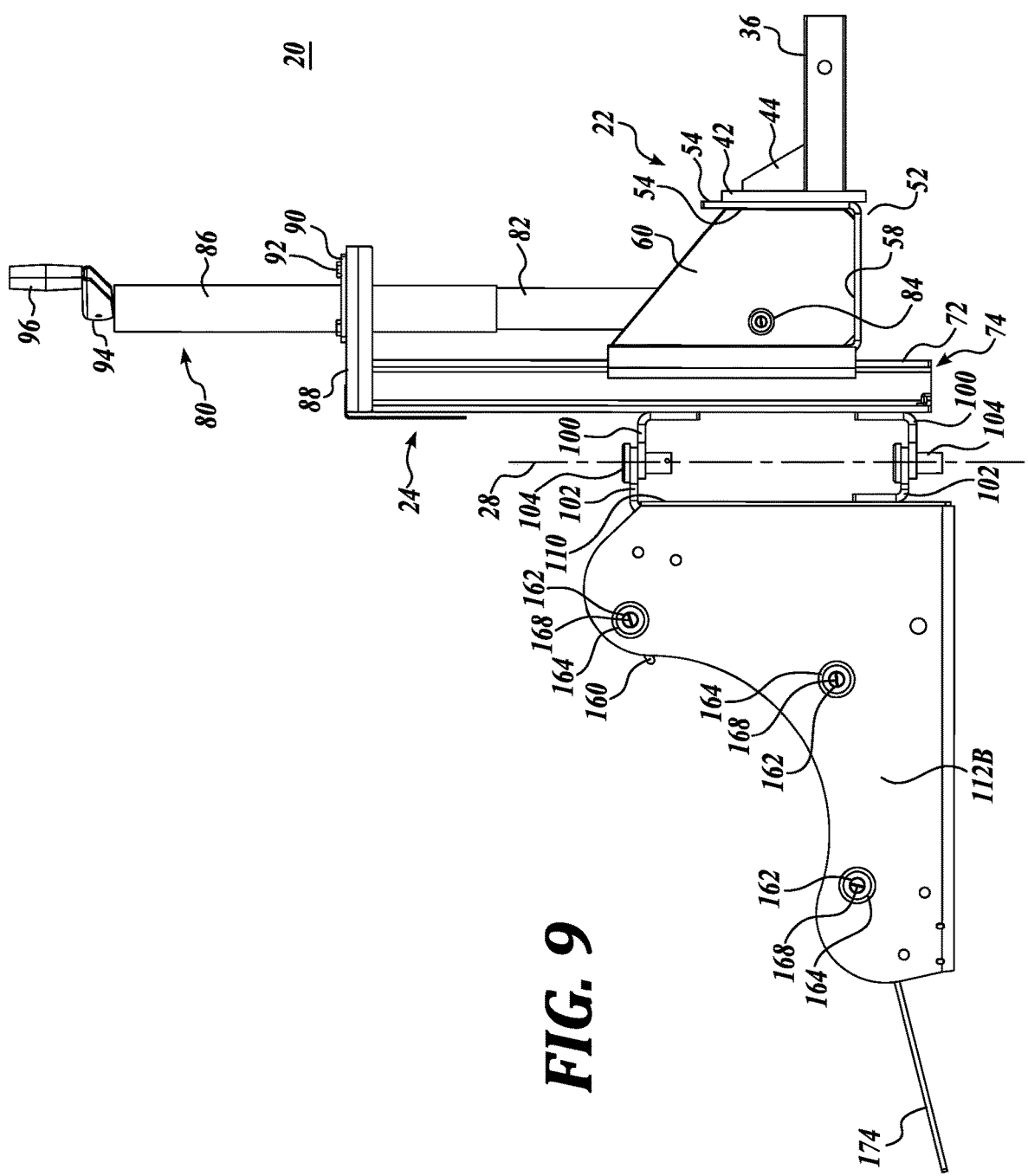
FIG. 9 is a side elevational view of the motorcycle towing hitch taken from the opposite side as FIG. 8.

The lift system 24 includes a base structure 52 composed of a forward vertical wall 54 spaced from a rearward, upright wall 56 by a horizontal floor 58 as well as a pair of side walls 60. As shown in the figures, including FIGS. 5, 6, and 8, the side walls 60 have a sloped upper edge transitioning upward from the upper portion of the forward wall 54 to the upper edge of the rearward wall 56. Also, the side walls 60 are canted somewhat inwardly in the rearward direction so as to provide access to the vertical side edge margins 62 of the rear wall 56, as discussed more fully below.

Vertical slides 66 are attached to the vertical margins 62 of the rear plate 56 by hardware members. The slides include exterior U or channel shaped members 68 for housing slides 70, which can be composed of an anti-friction material, such as a high density and/or high strength plastic. The slides 70 engage with the flange portions 72 of a slideway 74, which is shown as being in the shape of an I beam. The flanges 72 are closely receivable within the slots formed in the slides 70.

The slideway 74 is supported and moved vertically with respect to the mounting plate structure 42 by a jack 80. The base or lower portion 82 of the jack is pinned to an upper portion of the base structure side walls 60 by a cross pin 84 extending through aligned holes formed in the side walls 60 and through diametrically opposite holes formed in the jack base portion 82. The jack 80 includes an upper section 86 which is mounted to a top plate 88 extending horizontally forwardly from the top of slideway 74. The jack upper section 86 includes a triangularly shaped mounting plate 90 which is affixed to the jack top plate 88 by hardware members 92. The jack 80 is raised and lowered in a standard manner by a lead screw (not visible) operable by rotation of a handle 94 having a knob 96 rotatably attached and extending upwardly from the distal end of the jack handle 94. It will be appreciated that the jack 80 can be replaced by a motorized jack, not shown. By operation of the jack handle 94, the cradle 26 can be raised and lowered relative to base structure 52 as desired.

The cradle 26 is hingedly mounted to the slideway 74 by upper and lower brackets 100 extending rearwardly from the slideway 74 as well as upper and lower brackets 102 extending forwardly from the cradle 26. The brackets 100 and 102 are held together by pivot pins 104 that extend through close fitting holes formed in the brackets 100 and 102 whereby the cradle 26 is pivotal about the lift system 24 about vertical axis 28. The pivot pins 104 define an upright pivot axis 28 about which the cradle is able to pivot relative to the slideway 74 in particular and the receiver in general. The pivot axis in FIG. 1 is shown as being substantially vertical, but may vary from the exact vertical due to various factors such as the load on the towing vehicle 40.

Figure 13:
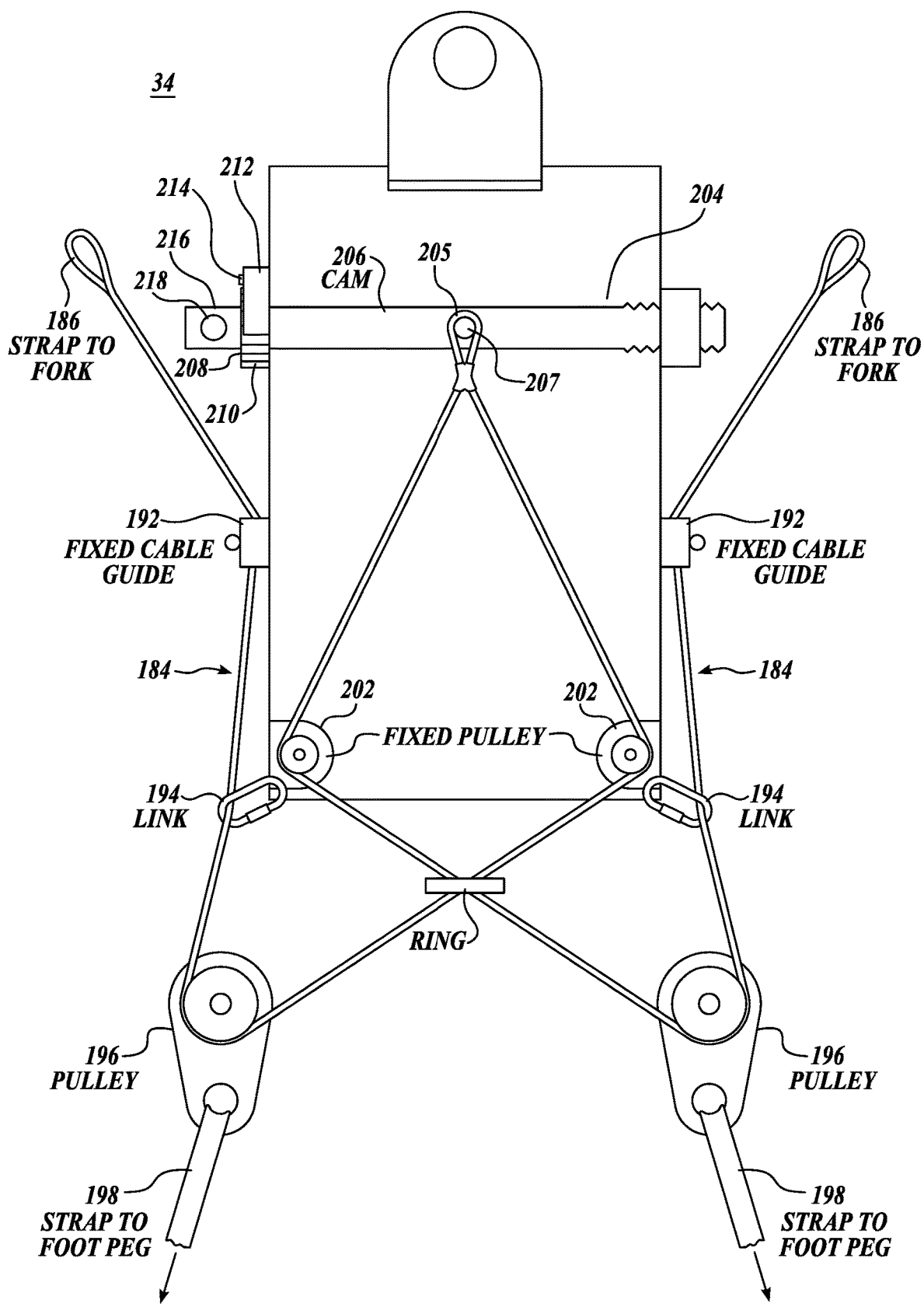
FIG. 13 is a schematic view of the cable restraint system used to ensure that the motorcycle is safely engaged with the motorcycle towing hitch.
Figure 14:
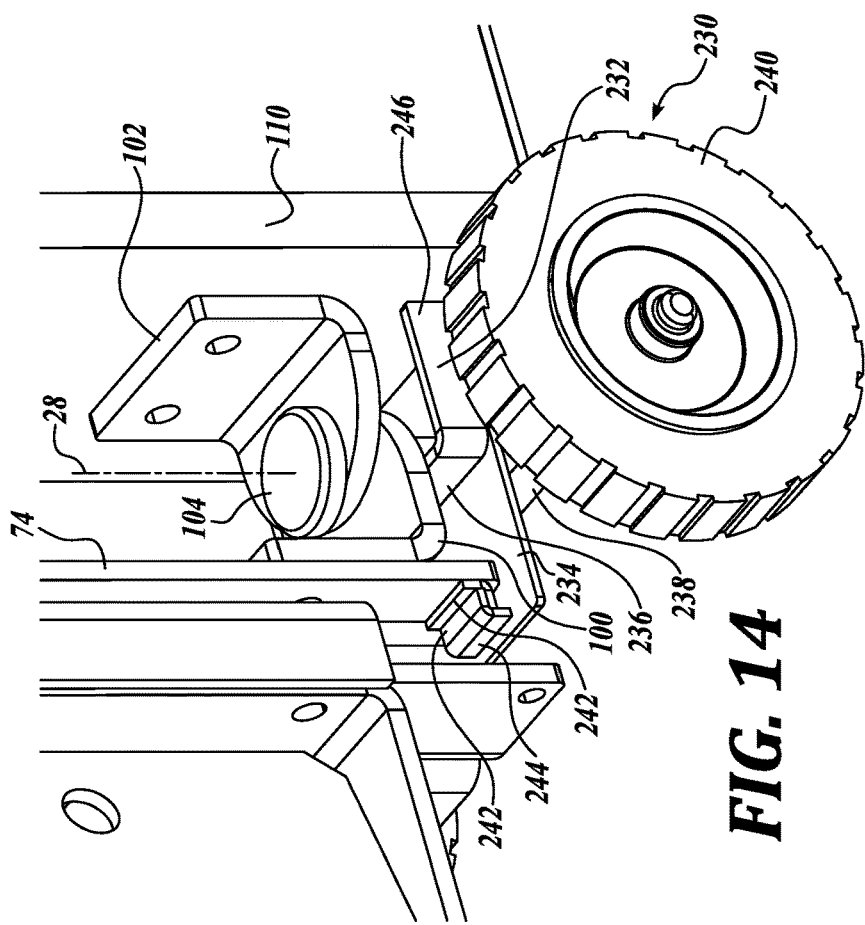
FIG. 14 is a fragmentary isometric view of the motorcycle towing hitch specifically illustrating a wheel assembly on which the motorcycle towing hitch may be positioned when not engaged with the vehicle whereby the motorcycle towing hitch can be conveniently moved about, for example, to be placed in a storage location.

The cradle 26 includes a vertical forward wall 110 from which the brackets 102 project forwardly and parallel side walls 112A and 112B as well as a floor 114 spanning between the lower edges of the side walls 112A and 112B. In side profile, the side walls 112A and 112B are generally triangular in shape having a vertical forward wall 110 and a horizontal flat bottom wall or floor 114. The hypotenuse or diagonal edge 116 of the cradle side walls 112 is rounded or otherwise curved in a concave shape so as to resemble the curvature of the motorcycle wheel 30 when received within the cradle, for example, as shown in FIGS. 1, 13, and 14. The concave hypotenuse 116 of the side walls 112A and 112B transition at the ends of the hypotenuse via rounded upper and lower ends 118 and 120 thereby to avoid any sharp corners and also to provide an aesthetically pleasing appearance.

As perhaps most clearly shown in FIGS. 3, 4, 10, and 12, the cradle 26 includes locking panels 130 that are generally arcuate in shape as shown in the figures. The curvature of the inside edge 132 corresponds closely with the rounded or curved hypotenuse 116 of the cradle side walls 112. At the upper ends, the locking panels 130 are mounted to a cross pin 134 that spans between the cradle side walls 112. Upper tabs 136 project from the locking panels 130. The tabs 136 have through holes for engaging over the cross pin 134. A compression spring 138 is engaged over the cross pin 134 between the tabs 136 to bias the locking panel 130 away from each other.

Figure 12:
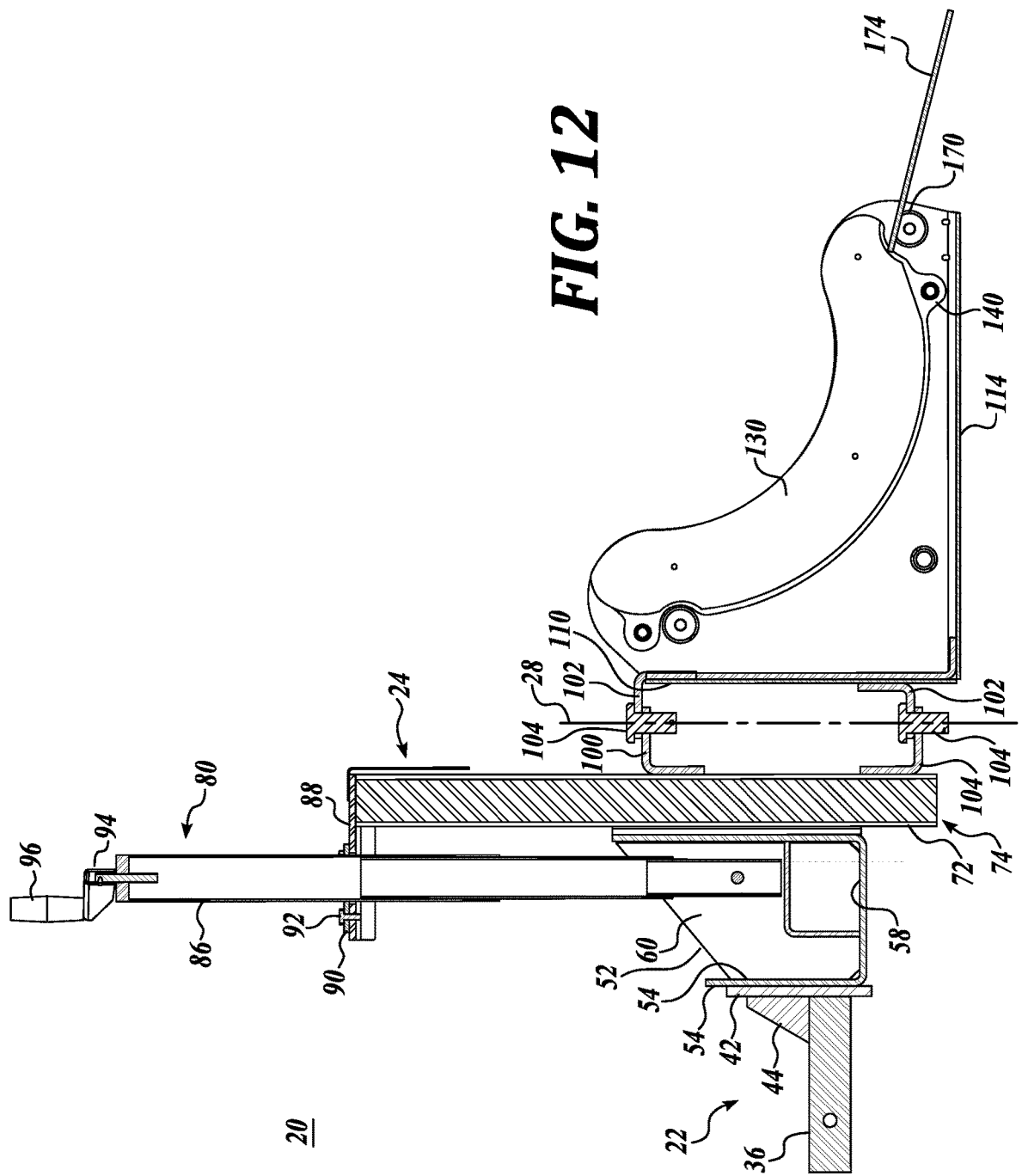
FIG. 12 is a side cross-sectional view of the motorcycle towing hitch taken substantially along the lines 12-12 of FIG. 10.

At the rearward lower portion of the locking panels 130, lower tabs 140 extend from the locking panels 130 to engage over a cross pin 142 also spanning between the carriage side walls 112, see FIG. 12. A compression spring 144 is engaged over the cross pin 142 to bias the adjacent portions of the locking panels 130 away from each other.

As mentioned above, the locking panels 130 serve to press against the sides of the motorcycle wheel 30 to securely capture the motorcycle within the cradle 36. To this end, tightening bolts 150 are mounted on cradle side wall 112A to be threadably engaged with circular threaded nuts 152 mounted to the side wall 112A. A circular foot 154 is attached to the leading end of the tightening bolts 150 to provide a bearing area against the adjacent side of the locking panel 130. Also, handles 160 are provided at the outward ends of the tightening bolts 150 to enable the tightening bolts to be manually rotated thereby to either advance the locking panel 130 toward the opposite locking panel 130 or retract the locking panel 130 from the opposite locking panel 130.

Figure 3:
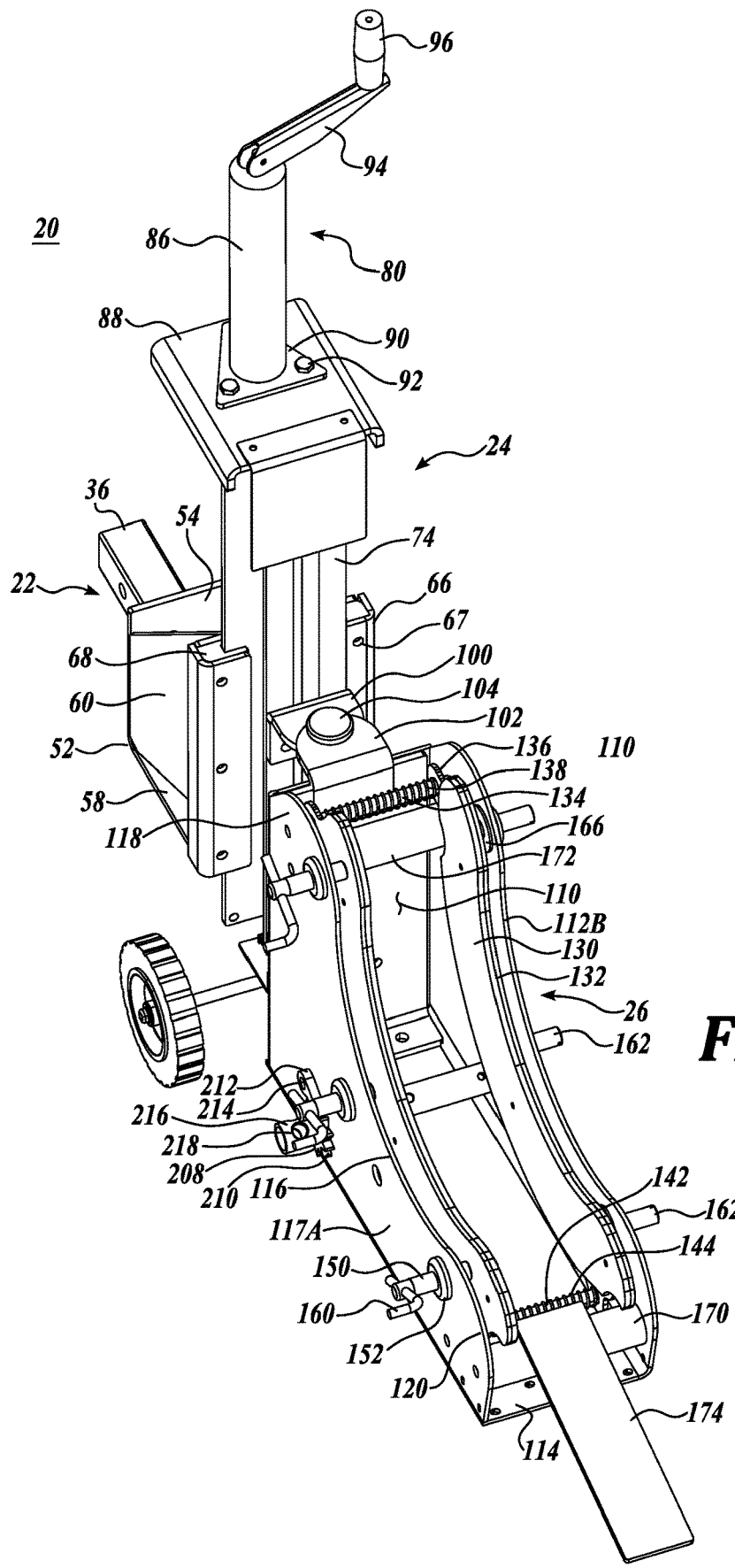
FIG. 3 is a further rear perspective view of the motorcycle towing hitch of FIG. 2.
Figure 4:
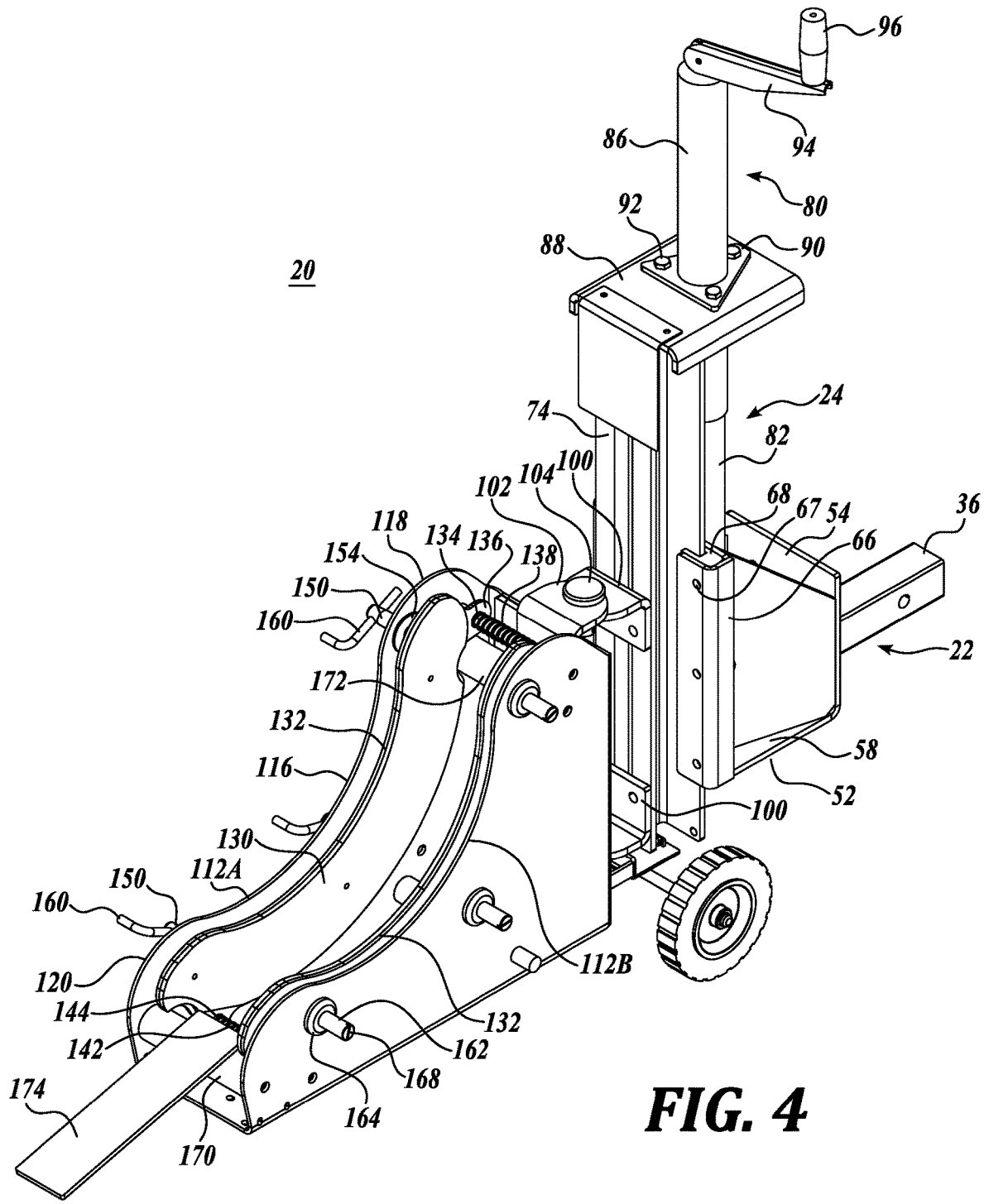
FIG. 4 is also a rear perspective view of the motorcycle towing hitch, but taken from the opposite side of the hitch of FIG. 3.
Figure 10:
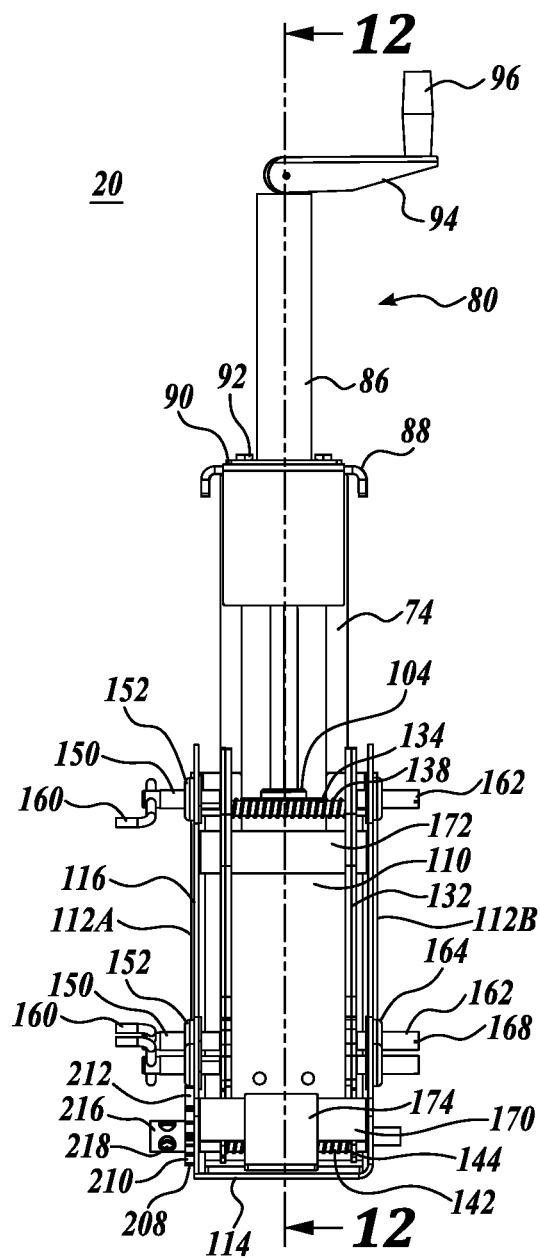
FIG. 10 is a rear elevational view of the motorcycle towing hitch.
Figure 11:
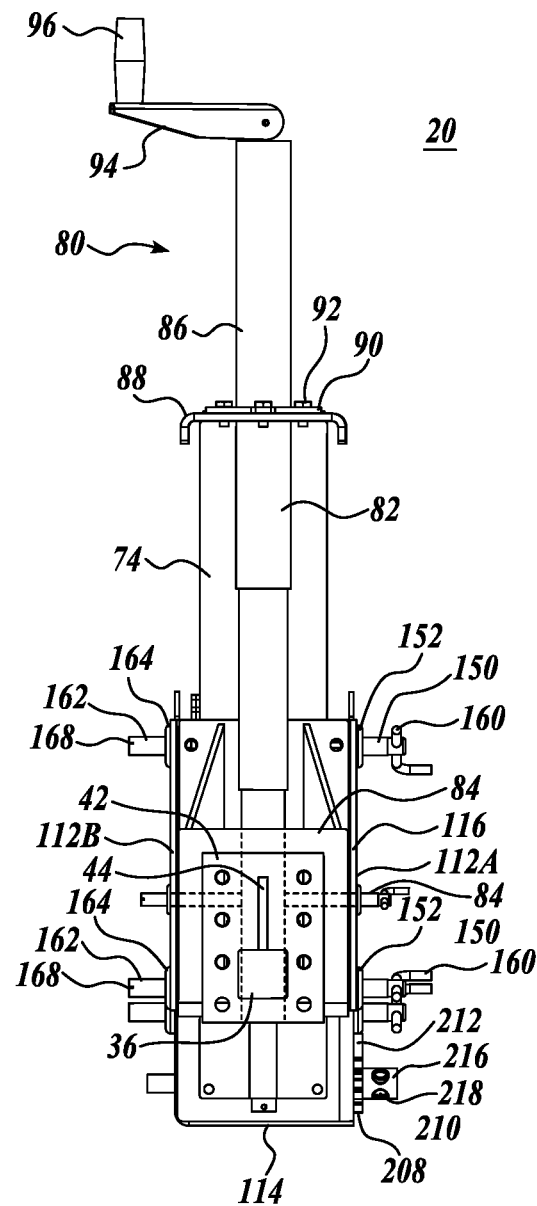
FIG. 11 is a front elevational view of the motorcycle towing hitch.

Further, as shown most clearly in FIGS. 3, 4 and 10, adjusting bolts 162 are positioned on the cradle side wall 112B in locations aligned with the tightening bolts 150. The adjusting bolts 162 engage with threaded circular nuts 164 mounted on the side wall 112B to threadably engage the bolts 162. The adjusting nuts 162 also include circular pads or feet 166 to provide a bearing area against the adjacent surface of the adjacent locking panel 130. The adjusting bolts 162 can be rotated relative to the nuts 164 thereby to nominally position the adjacent locking panel 130 at a desired location relative to the side wall 112B. It will be appreciated that such an adjustment may be needed so as to center the wheel 30 side to side in the cradle 26. Cross slots 168 are formed in the end of the adjusting bolts 162 to receive a screwdriver or similar tool to rotate the adjusting bolts 162.

Referring to FIGS. 3, 4, 10, and 12, a cross tube 170 spans between the side walls 112A and 112B of the cradle at the rearward lower end of the cradle. The cross tube 170 is of sufficient diameter to serve as a restraint against the wheel 30 of the motorcycle 32. A corresponding cross tube 172 spans between the upper forward end of the cradle between the side walls 112A and 112B, which serves to function as a forward restraining member against the motorcycle wheel 30. Thus, the motorcycle wheel 30 sits within the cradle 26 between the two cross tubes 170 and 172.

As shown in FIGS. 3, 4, 10, and 12, a ramp 174 projects rearwardly from a cross tube 170 on which the wheel 30 may roll when being engaged within the cradle 26 or disengaged from the cradle 26. As will be appreciated, some motorcycles weigh in excess of 1200 pounds and thus pushing the front wheel 30 over an impediment, even a relatively low lying impediment, may be difficult. However, the ramp 174 facilitates the entry and exit of the wheel 30 from the cradle 26.

Next, referring specifically to FIG. 13, a restraining system 30 serves to lock the handlebars 180 and front fork 182 from rotating relative to the motorcycle frame. The restraining system 30 also helps ensure that the front wheel 30 remains engaged within the cradle 26. The restraint assembly 34 includes cable assembly 184 having an elongate cable 190. The ends of the cable 190 are attached to a fork strap 186 for attaching to the lower end of the fork 182 at each side thereof. From the two fork straps 186, the cable 190 extends downwardly to extend around a fixed cable guides 192 to thereafter extend rearwardly toward the motorcycle 32. At the bottom rear of the cradle side walls 112A and 112B, a link guide 194 is mounted to the cradle, through which the cable 190 passes therethrough. From the link guides 194, the cable 190 extends rearwardly and then around pulleys 196 which are attached to foot peg straps 198, which is engageable with the left foot rests or pegs 200 of the motorcycle. From the pulleys 196, the cable 190 then extends forwardly and diagonally across to the opposite side of the cradle and through a pulley guides 202 attached to the floor 114 of the cradle located on the opposite side of the motorcycle wheel 30. From the pulley guides 202, the cable extends forwardly to a winch 204 located in the forward, lower portion of the cradle. The cable 190 is attached via loop 205 laterally centrally to a winch shaft 206 extending transversely between the side walls 112A and 112B of the cradle. A cross peg 207 extends transversely outwardly from the winch shaft 206 to receive the cable loop 205. The cross peg 207 can be notched to help retain the cable engaged over the cross peg. The winch shaft 206 extends outwardly through the side walls 112A and 112B.

A star wheel 208 is attached to the end of the winch shaft 206 extending outwardly of cradle wall 112A. The star wheel 208 has outwardly radiating teeth 210. A pawl 212 is adapted to engage the winch teeth 210. The pawl 212 is pivotably mounted on a pivot pin 214 so that the pawl by force of gravity nominally engages the winch teeth 210. A short barrel 216 extends outwardly from the star wheel 208 and includes a cross hole 218 formed therein for receiving the end of a round bar or other tool which can be used to rotate the winch shaft 206 to tighten the cable 190 thereon.

It will be appreciated that as the cable 190 is tightened, a downward force is imposed on the front fork 182, thereby to load the wheel 30 into the cradle 26. Also, with the tightening of the cable 190, the bike is loaded forwardly against the cradle to securely engage the front wheel in the forward direction in the cradle as well as preventing rotation of the front fork 182 relative to the bike frame 219. As such, when the vehicle 40 rounds a corner, the motorcycle 32 is maintained in upright position by the hitch 20.

It will be appreciated that if the fork 182 were allowed to pivot relative to the bike frame 219 when rounding a corner, the bike would automatically tilt sideways toward the inside of the corner. If the turn is sharp enough, the side of the motorcycle may actually scrape the ground. This does not occur in the motorcycle hitch 20 because the front fork 182 is not able to rotate relative to the bike frame. As such, the bike frame remains in upright orientation at all times, including when being towed around a corner.

To use the motorcycle hitch 20, the receiver 22 is connected to the receiver tube 36 of the vehicle 40. In this regard, a wheel assembly 230, as described below, enables the motorcycle hitch to be conveniently moved from storage location to an engagement position with the receiver tube 38. Once the motorcycle hitch 20 has been engaged with the receiver tube, the lift system 22 can be operated to lower the cradle 26 to the ground, if not already at ground level. Thereafter, the motorcycle front wheel 30 is placed within the cradle 36 between the locking panels 130 of the cradle. It may be necessary to initially adjust the position of the locking panel 130 adjacent cradle side wall 112B to the correct position relative to the opposite locking panel 130. Thereafter, the tightening bolts 150 are advanced using handles 160 to press the adjacent locking panel 130 against the wheel 30 thereby to securely capture the wheel in the cradle.

Once the motorcycle front wheel 30 has been locked in place within the cradle 26, the lift system 22 is operated to raise the front of the motorcycle off the ground to a desired elevation by operation of the jack 80 as described above. This causes the cradle to rise upwardly relative to the base portion of the lift system 22. As the cradle rises upwardly, the lift system automatically disengages from the wheel assembly which had been positioned beneath the hitch and automatically disengages from the wheel assembly as described below.

Next, a cable assembly 184 of restraining system 34 is installed by first placing the center loop 205 over transverse pin 207 of the winch 204 and then placing the cable 190 around fixed pulleys 200. The cable 190 is then fed around pulleys 196 after the straps 198 attached to the pulleys have been secured around the foot peg/foot rests 200 of the motorcycle 32. Next, the cable 190 is extended through restraining links 194 at the rear of the cradle 26 and then fed around fixed pulley guides 192 at each side of the cradle 26. The above steps may be performed before the front wheel 30 is placed in the cradle 26, thereby to provide access to the interior of the cradle. Thereafter, the strap 186 at the distal ends of the cable 190 are secured to the bottom of the front fork 182 at each side of the motorcycle.

With the cable restraining system 34 thus in place, the winch 204 is rotated thereby to tighten the cable 190. Through such tightening, the downward load is placed on the front fork 182 and a tension load is applied between the front fork 182 and the motorcycle frame 191 so that the fork 182 is not able to rotate relative the frame 191. Rather, the fork 182 and associated front motorcycle wheel 130 are held stationary with respect to the motorcycle frame. As such, when rounding a corner, the motorcycle hitch rotates about vertical axis 28 thereby to cause the motorcycle to remain upright rather than the motorcycle leaning into the turn, as would be the case if the front fork 182 were able to rotate relative to the motorcycle frame. As such, damage to the motorcycle when negotiating a corner, especially a sharp corner, is avoided since the motorcycle frame 219 is maintained in upright position.

To disengage the motorcycle 32 from the motorcycle hitch 20, the above procedure is reversed. In this regard, the lift 22 is operated to lower the cradle 26 to the ground. Before doing so, a wheel assembly may be positioned beneath the lift system 22. Once the cradle has been lowered to the ground, the cable restraint system 34 is disengaged by unwinding the winch 204 to loosen the cable 190 so that the fork straps 186 and the foot peg straps 198 may be detached. Thereafter, the motorcycle may simply be rolled rearwardly off of the cradle 96 and down the ramp 174. Thereafter, the hitch 20 may be disengaged from the receiver tube 38 and then the hitch 20 can be easily moved using wheel assembly 230 as discussed below to a storage location. As will be appreciated, the engagement of the hitch 20 with the receiver tube 38 and the disengagement of the hitch 20 from the receiver tube can be easily accomplished without any significant lifting required of the user due to the presence of the wheels While illustrative embodiments have been illustrated and described, it will be appreciated that various changes can be made therein without departing from the spirit and scope of the invention. In this regard, referring to FIGS. 2, 4, 14, and 15, a wheel assembly 230 is provided for supporting the motorcycle hitch 20 when detached from the vehicle 40 to enable the hitch to be moved about easily. In this regard, the wheel assembly includes a U-shaped bracket 232 mounted on a base plate 234 to be disposed slightly forwardly from a lower part of the cradle forward wall 110. As such, the ends 246 of the bracket 232 are adjacent, but spaced away from the cradle forward wall 110. The transverse center portion 236 of the U-shaped bracket is disposed in alignment with and between the lower bracket 100 attached to the slideway 74.

A transverse axle shaft 238 is attached to the underside of the base plate 234. Wheels 238 are attached to the outer ends of the axle shaft 236.

Figure 15:
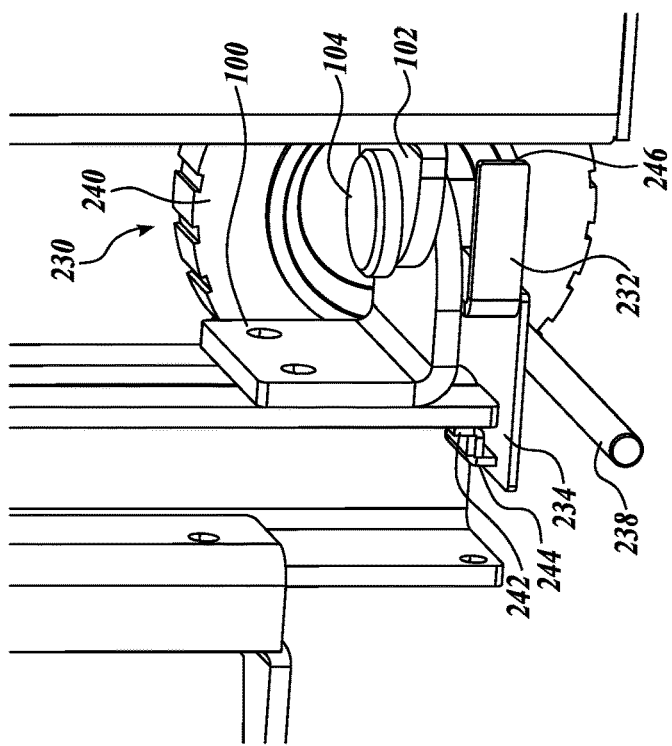
FIG. 15 is a fragmentary isometric view of the wheel assembly shown in FIG. 16 but viewed from the rear and towards the forward end of the hitch 20.

Referring specifically to FIGS. 14 and 15, an angle shaped lower bracket 242 is attached to the lower portion of the rear wall of slideway 74 so that one leg of the bracket 242 overlies the slideway wall and a second leg of the bracket extends horizontally away from the wall in the forward direction (toward vehicle 40). A second, upper angle bracket 244 is attached to the upper surface of the base plate 234. One leg of the angle bracket 244 extends upwardly from the top surface of the base plate 234, with the second leg of the angle bracket extending horizontally rearwardly in the direction toward the cradle 26. As shown in FIGS. 14 and 15, when the wheel assembly 230 is in place underneath the motorcycle hitch 20, the horizontal leg of the upper angle bracket 244 overlies and is supported by the horizontal leg of the lower angle bracket 244. This results in the wheel assembly 230 being maintained in engagement with the underside of the motorcycle hitch 20.

It will be appreciated that when the wheel assembly 230 is in position beneath the motorcycle hitch 20, the U-shaped bracket 232 performs several functions. As a first function, the bracket acts as a spacer between the underside of bracket 100 and the wheel assembly base plate 234. In addition, the U-shaped bracket 232 serves to help keep the cradle 26 in alignment with lift system 22 by the ends 246 of the bracket 232 bearing against the forward surface of the cradle forward wall if the cradle pivots to any significant extent relative to the lift system 22 about axis 28. Thirdly, the bracket creates a balance point above the axle shaft 238 since the transverse intermediate portion 236 of the bracket 232 is positioned substantially in alignment and above the axle 238.

It will be appreciated that by the foregoing construction, the wheel assembly 230 enables the motorcycle hitch to be moved about by simply tilting the motorcycle hitch downwardly in the forward direction and using the jack upper section 86 and/or jack handle 94 to steer the motorcycle hitch during movement thereof. As such, the motorcycle hitch 20 can be easily positioned with respect to the vehicle 40 when mounting the hitch to the vehicle, as well as when detaching the hitch from the vehicle for storage.

Figure 16:
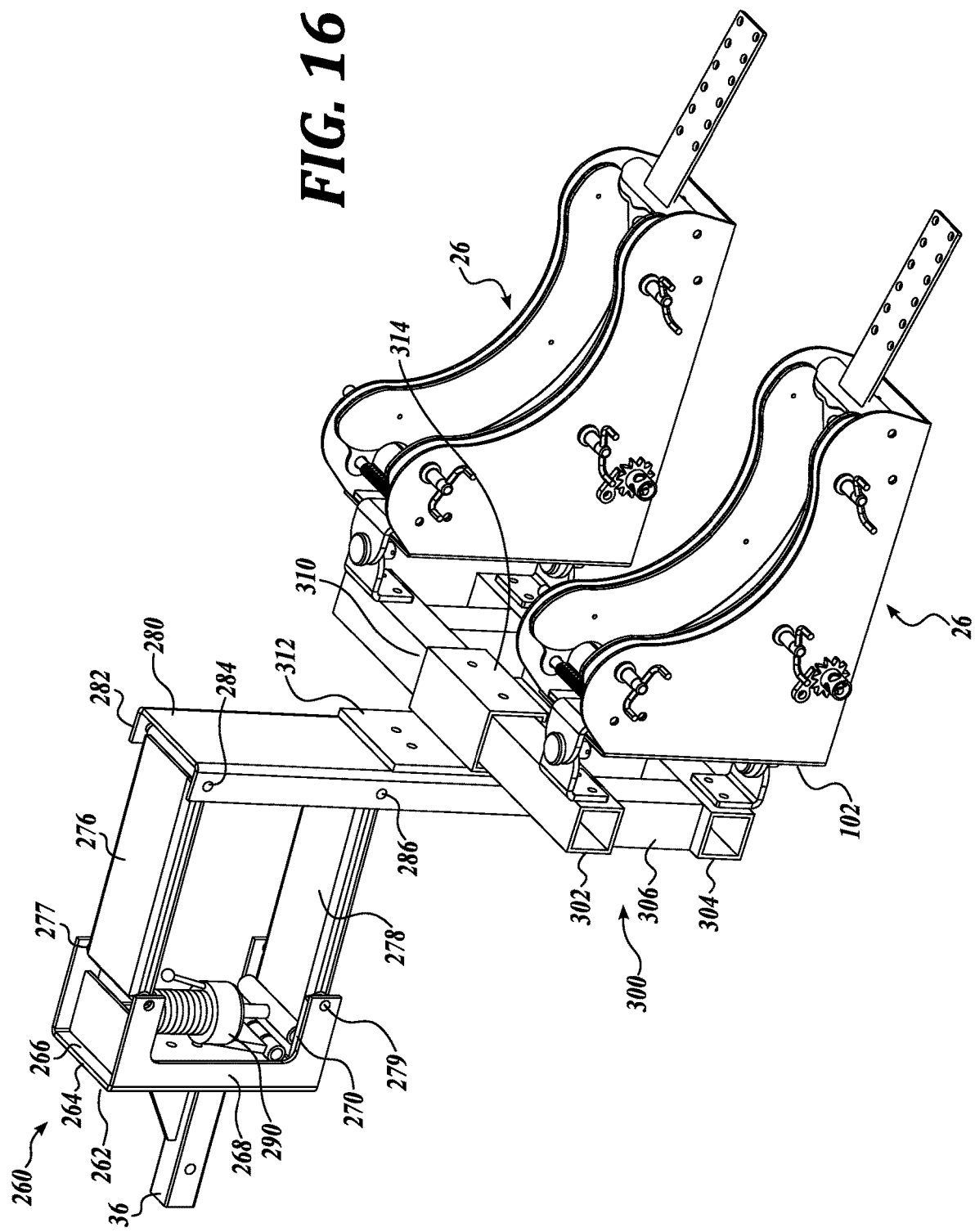
FIG. 16 is a top rearward perspective view of the second embodiment of the motorcycle towing hitch according to the present disclosure adapted to tow two motorcycles in side-by-side relationship, with the motorcycle cradles shown in lowered or loading position.
Figure 17:
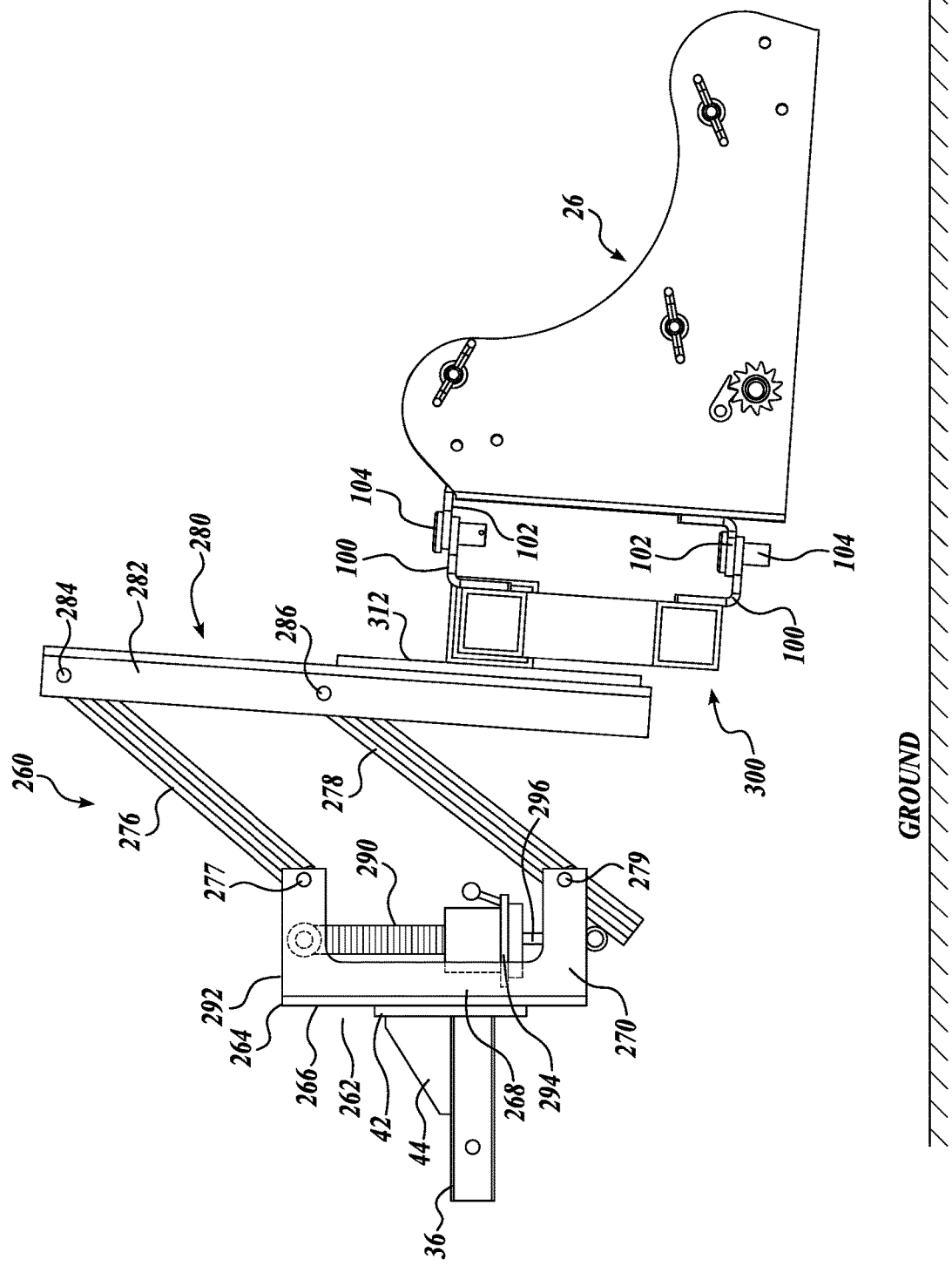
FIG. 17 is a side elevational view of FIG. 16.
Figure 18:
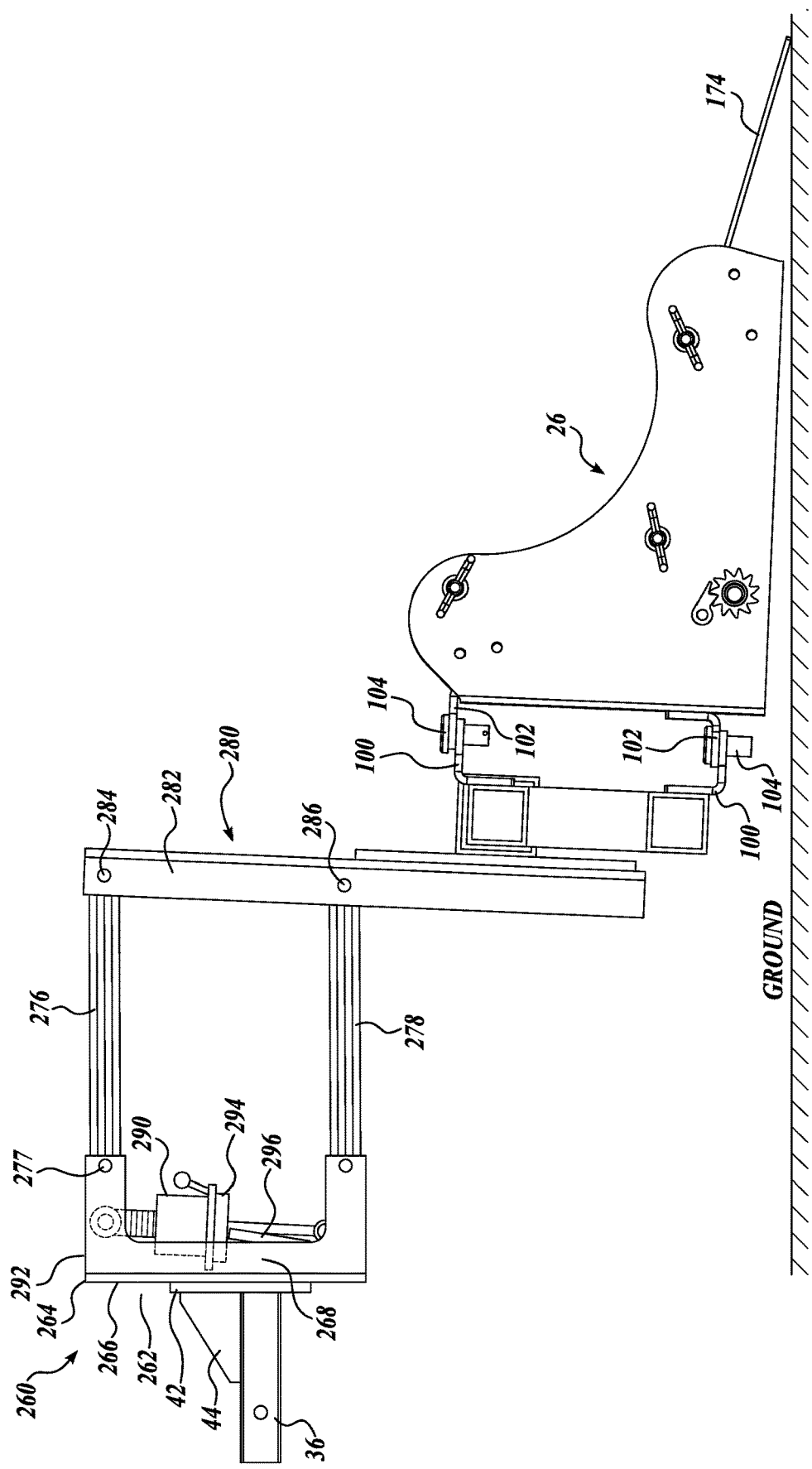
FIG. 18 is a side elevational view of FIG. 16, showing the cradles in raised or towing position.

In a second embodiment to the present disclosure, a motorcycle towing hitch 20' is instructed to tow two motorcycles in side-by-side arrangement as shown in FIGS. 16-18. Although the motorcycle towing hitch 20' is shown as constructed to tow two motorcycles, it is to be understood that the motorcycle towing hitch 20' could be adapted to tow different numbers of motorcycles, including for example, one or three motorcycles. The hitch 20' includes a receiver 22' to which is attached a lift system 260.

The lift system 260 is operable to raise and lower two side-by-side cradles 26 which are hinged to the lift system to rotate about upright (vertical) axes 28. As in the hitch 20, the cradles 26 function to receive the front wheels of motorcycles and hold the wheels captive in the cradles. The handlebars of the motorcycles are prevented from rotating by a cable restraint system 34 extending between the motorcycles and the motorcycle towing hitch 20', and in particular the cradles 26.

Describing the motorcycle towing hitch 20' in more detail, as in the receiver 22, the receiver 22' includes a receiver bar 36 which is receivable within a standard receiver tube 38, for example, as shown in FIG. 1. The receiver 22' also includes a vertical mounting plate 42 to which the adjacent (rearward) end of the receiver bar 26 is attached to cantilever outwardly (forwardly) from the plate 42.

A reinforcement plate 44 extends between the top surface of the receiver bar 36 and the adjacent face of the mounting plate 42 thereby to provide reinforcement therebetween. The reinforcement plate 44 is shown as generally triangular in shape due to the perpendicular relationship between the horizontal receiver bar 36 and the vertical mounting plate 42. Of course, the reinforcement plate 44 can be of other shapes. In addition, other reinforcement means can be utilized between the receiver bar 36 and the mounting plate 42.

As with lift system 24 described above, this system 260 also functions to raise and lower the cradles 26. In the lowered position, the cradles 26 can rest on or near the ground so that motorcycles can be conveniently rolled forwardly to position the front wheels of the motorcycles within the cradles 26. Thereafter, the lift system 24 can be operated to raise the cradles upwardly off the ground and into towing position, for example, as shown in FIGS. 16 and 18.

The lift system 260 includes a mounting structure 262 for attaching the lift system 260 to the receiver 22'. The mounting structure 262 includes a channel structure 264 having a vertical, planar, rectangularly shaped web section 266 as attached to the back side of the mounting plate structure 42. The channel structure 264 also includes side flanges 268 that extend rearwardly from the web section 266. Further, at the bottom and top of the channel structure 264, the flanges of the channel structure consist of elongated arm sections 270 that extend rearwardly further than the intermediate section of the flanges 268.

The rearward or distal ends of the upper extended arms 270 are pinned to the forward end of an upper torque plate 276 at pivot location 277, whereas the rearward or distal ends of the lower extended arms 270 are pivotally attached to a lower torque plate 278 at pivot location 279. As shown in FIGS. 16-18, the forward end of the lower torque plate 278 extends beyond the pivoting attachment location with the lower extended arms 270.

The rearward ends of the upper and lower torque plates 276 and 278 are pinned to an upright mounting channel 280. The rearward ends of the upper and lower torque plates 76 and 78 are rotatably pinned to the side flanges 282 of the mounting channel 280 at pivot locations 284 and 286.

As illustrated in the figures and as can be appreciated, the channel structure 264, the upper and lower torque plates 276 and 278, and the mounting channel 280 form a four-bar link arrangement wherein the upper and lower torque plates can be pivoted about their ends to raise and lower the mounting channel 280, which remains in an upright (vertical) orientation. The raising and lowering of the channel mount is accomplished with a powered actuator 290 having its upper base mounted to an actuator plate 292 extending between the arms 270 at the upper end of channel structure 264. An intermediate portion of the actuator 290 is supported by an actuator mounting bracket 294 extending rearwardly from the web section 266 and flanges 268 of the mounting structure 262 at a location above the lower extended arms 270 of the mounting structure.

The actuator 290 includes an extendable telescoping shaft 296 that may be hinged or otherwise attached to or operably associated with the adjacent forward end of the lower torque plate 278. As such, when the shaft 96 is extended, the upper and lower torque plates 276 and 278 are rotated in a counter-clockwise direction thereby to raise the mounting channel 280. Whereas when the shaft 296 is retracted, the upper and lower torque plates 276 and 278 rotate in a clockwise direction thereby to lower the mounting channel 280. The actuator 290 can be of various constructions, for example, the actuator can be electrically or hydraulically powered to extend and retract the telescoping shaft 296.

The upper and lower torque plates 276 and 278 may be of hollow construction, each composed of an upper surface, a lower surface, and side surfaces. In this regard, the torque plates could be fabricated from individual top plate, bottom plate and side panels. Alternatively, the torque plates can be constructed from shallow channel members which are attached together along the flanges of the channel members to form a hollow structure. As a further option, the upper and lower torque arms could be composed of nominally tubular members which are cut to desired lengths to fabricate the torque plates. It will be understood that the torque plates, being hollow, provide significant strength, while being considerably lighter in weight than if the torque plates were of solid construction.

A horizontal support assembly 300 is mounted to the back side of the mounting channel 280 to extend transversely from the mounting channel. The horizontal support assembly 300 is illustrated as constructed from upper and lower tubular members 302 and 304 that are vertically interconnected by a series of upright tubular cross members 306 to form a lightweight, but rigid and strong structure capable of supporting the forward ends of a pair of motorcycles. The horizontal support assembly 300 is attached to the mounting channel 280 by a mounting bracket 310 having a plate portion 312 in face-to-face relationship with the web portion of the mounting channel 80 and collar or tube portions 314 that encircle the upper and lower tubes 302 and 304 of the support assembly 300. In this manner, the support assembly 300 is securely attached to the mounting channel 280. Of course, other means could be used in this regard.

The horizontal support assembly 300 serves as the mounting locations for the brackets 100 used to pivotally mount the cradles 26 in the same manner as described above with respect to motorcycle towing hitch 20. As noted above, the cradles 26 shown in FIGS. 16-18 are the same as the motorcycle cradle 26 shown in FIGS. 1-15. Moreover, the cable restraint system used with the motorcycle hitch 20' is the same as the restraint system 34 used with the motorcycle hitch 20.

It is to be understood that although two cradles 26 are shown in FIGS. 16-18 as employed in conjunction with motorcycle hitch 20', a singular cradle 26 may be utilized. In this regard, the horizontal support assembly 300 would not be needed. Rather, the mounting brackets 100 could be mounted directly to the channel mount 280.

Further, the motorcycle hitch 20' could be adapted to utilize, for example, three cradles 26. In this regard, the length of the horizontal support assembly may be increased so that three cradles can be positioned side by side to each other. Adjustments may be necessary to the thicknesses and other dimensions of the components of the motorcycle towing hitch 20' described above so as to accommodate the increased weight of the third motorcycle.

While illustrative embodiments have been illustrated and described, it will be appreciated that various changes can be made therein without departing from the spirit and scope of the invention.

The invention claimed is:
1. A motorcycle towing hitch comprising:
   a support structure mountable to a towing vehicle;
   a cradle for receiving and holding the front wheel of a motorcycle;

a pivot mount to mount the cradle to the support structure to pivot about an upright axis;

a restraining system to restrain the front fork of the motorcycle to pivot relative to the frame of the motorcycle;

wherein the cradle includes upright side walls connectable by a floor, the side walls spaced apart to receive the front wheel of a motorcycle therebetween; and wherein the cradle includes movable locking panels disposed along the inside surfaces of the cradle side walls to define the motorcycle wheel receiving gap therebetween, the locking panels being adjustable to press against the side of the motorcycle front wheel thereby to hold the motorcycle front wheel securely within the cradle.

2. The motorcycle towing hitch according to claim 1, wherein the support structure comprises an elevation system to raise and lower the cradle.

3. The motorcycle towing hitch according to claim 2, wherein:

the elevation system comprises a base structure carried by the support structure, at least two pivot links having forward ends pivotally connected to the base structure and rearward ends pivotally connected to a cradle mount structure; and a lift actuator to pivot the pivot links about the base structure to raise and lower the cradle mount structure.

4. The motorcycle towing hitch according to claim 3, wherein the cradle mounting structure extends sufficiently in the direction laterally of the length of the towing vehicle to enable at least two motorcycle cradles to be mounted on the cradle mounting structure in side-by-side relationship to each other so that the motorcycles engaged within corresponding cradles do not interfere with each other.

5. The motorcycle towing hitch according to claim 1, wherein the cradle comprises a forward abutment for bearing against the front of the motorcycle wheel when the motorcycle is engaged within the cradle.

6. The motorcycle towing hitch according to claim 1, wherein the side walls are generally triangular in shape with an upright front side, a generally horizontal bottom side, and a diagonal hypotenuse that extends rearwardly and downwardly from the front side of the cradle.

7. The motorcycle towing hitch according to claim 1, wherein the cradle includes the movable locking panels that are adjustable to separate the locking panels from the sides of the motorcycle front wheel to enable the motorcycle to be removed from the cradle.

8. The motorcycle towing hitch according to claim 7, further comprising a biasing system to bias the locking panels to move in a direction away from each other.

9. The motorcycle towing hitch according to claim 1, wherein the pivot mount comprises an upper and lower hinge structure connected between the support structure and the cradle to define an upright pivot axis.

10. The motorcycle towing hitch according to claim 1, wherein the restraining system loads a motorcycle front wheel downwardly into the cradle and simultaneously loads the motorcycle frame forwardly relative to the cradle thereby preventing the motorcycle fork from rotating relative to the motorcycle frame.

11. The motorcycle towing hitch according to claim 10, wherein the restraining system includes a first cable section attached to a lower portion of the fork on each side of the motorcycle to draw the front fork downwardly toward the cradle to load the front fork downwardly into the cradle.

12. The motorcycle towing hitch according to claim 1, further comprising a wheel assembly for supporting the motorcycle hitch when not mounted on a towing vehicle, the wheel assembly comprising a support surface axled to spaced apart wheels, the support surface positionable beneath portions of the motorcycle hitch to support the motorcycle hitch.

13. The motorcycle towing hitch according to claim 12, wherein the wheel assembly comprises a first bracket carried by the support wheels, the first bracket engageable with a second bracket is attached to the support structure.

14. A motorcycle towing hitch comprising:

a support structure mountable to a towing vehicle;

a cradle for receiving and holding the front wheel of a motorcycle;

a pivot mount to mount the cradle to the support structure to pivot about an upright axis;

a restraining system to restrain the front fork of the motorcycle to pivot relative to the frame of the motorcycle;

wherein the support structure comprises an elevation system to raise and lower the cradle; and wherein the elevation system comprises an upright slideway mounted to the support structure and engageable with a slide to which the cradle is mounted; and an actuator for raising and lowering the slide relative to the slideway.

15. The motorcycle towing hitch according to claim 14, wherein the cradle includes upright side walls connectable by a floor, the side walls spaced apart to receive the front wheel of a motorcycle therebetween.

16. The motorcycle towing hitch according to claim 15, wherein the side walls are generally triangular in shape with an upright front side, a generally horizontal bottom side, and a diagonal hypotenuse that extends rearwardly and downwardly from the front side of the cradle.

17. The motorcycle towing hitch according to claim 15, wherein the cradle includes movable locking panels disposed along the inside surfaces of the cradle side walls to define the motorcycle wheel receiving gap therebetween, the locking panels being adjustable to press against the side of the motorcycle front wheel thereby to hold the motorcycle front wheel securely within the cradle.

18. A motorcycle towing hitch comprising:

a support structure mountable to a towing vehicle;

a cradle for receiving and holding the front wheel of a motorcycle;

a pivot mount to mount the cradle to the support structure to pivot about an upright axis;

a restraining system to restrain the front fork of the motorcycle to pivot relative to the frame of the motorcycle;

wherein the restraining system loads a motorcycle front wheel downwardly into the cradle and simultaneously loads the motorcycle frame forwardly relative to the cradle thereby preventing the motorcycle fork from rotating relative to the motorcycle frame;

wherein the restraining system includes a first cable section attached to a lower portion of the fork on each side of the motorcycle to draw the front fork downwardly toward the cradle to load the front fork downwardly into the cradle;

wherein the restraining system includes a second cable section attached to the front foot rests or front pegs of the motorcycle on each side of the motorcycle to draw the motorcycle frame forwardly towards the cradle; and wherein the first cable section attached to the lower portion of the front forks of the motorcycle is the same cable comprising the second cable section attached to the motorcycle foot rests or foot pegs.

19. The motorcycle towing hitch according to claim 18, wherein the restraining system comprises a tensioning system to take up slack in the cable comprising the first and second cable sections.

20. The motorcycle towing hitch according to claim 19, wherein the tensioning system comprises a winch for spooling the cable to draw the first and second cable sections toward the cradle.

* * * * *